US007752502B2

(12) United States Patent
Clee et al.

(10) Patent No.: US 7,752,502 B2
(45) Date of Patent: Jul. 6, 2010

(54) METHOD AND APPARATUS FOR TESTING SOFTWARE

(75) Inventors: Scott John Clee, Hampshire (GB); Ian George Griffiths, Hants (GB); Robert Harris, Dorset (GB)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 11/463,395

(22) Filed: Aug. 9, 2006

(65) Prior Publication Data

US 2007/0038898 A1 Feb. 15, 2007

(30) Foreign Application Priority Data

Aug. 10, 2005 (GB) .................................. 0516400.9

(51) Int. Cl.
*G06F 11/00* (2006.01)
(52) U.S. Cl. ........................................ 714/38; 717/124
(58) Field of Classification Search ................... 714/38; 717/124
See application file for complete search history.

(56) References Cited

U.S. PATENT DOCUMENTS

| | | | |
|---|---|---|---|
| 5,455,938 A | | 10/1995 | Ahmed |
| 5,828,829 A * | | 10/1998 | Yamauchi et al. ............. 714/38 |
| 5,870,539 A * | | 2/1999 | Schaffer ....................... 714/38 |
| 5,933,633 A * | | 8/1999 | Good et al. .................. 717/131 |
| 6,385,741 B1 * | | 5/2002 | Nakamura .................... 714/38 |
| 6,408,262 B1 | | 6/2002 | Leerberg et al. |
| 6,694,509 B1 | | 2/2004 | Stoval et al. |
| 7,055,065 B2 * | | 5/2006 | Farchi et al. .................. 714/38 |
| 7,143,073 B2 * | | 11/2006 | Barrett ........................ 706/37 |
| 2003/0126506 A1 * | | 7/2003 | Lin ............................. 714/38 |
| 2005/0050522 A1 * | | 3/2005 | Kami et al. ................. 717/124 |
| 2007/0234300 A1 * | | 10/2007 | Leake et al. ................ 717/124 |

\* cited by examiner

*Primary Examiner*—Philip Guyton
(74) *Attorney, Agent, or Firm*—Carey Rodriguez Greenberg & Paul, LLP

(57) ABSTRACT

A state table includes a plurality of possible states of a computer system and the corresponding actions which produce transitions between source and target states. A set of test programs is stored, each test program performing an action in the state table. A test selects an action corresponding to the current state of the computer system; executes the test program which performs the selected action; determines the state of the computer system after the test program has executed; and compares the determined state to the state indicated in the state table as the target state to the selected action on the source state. When an error is found, instead of stopping execution, the test operations to be performed are dynamically reconfigured. Weightings are dynamically allocated to actions in the state table to create a weighted set, and selection of the next test is carried out using random selection over the weighted set. Thus, the continued testing is biased over time towards particular transitions and/or states near to the error location. This enables a tester to discover any other bugs in the same area and also to obtain further diagnostic data on the failure.

11 Claims, 3 Drawing Sheets

METHOD AND APPARATUS FOR TESTING SOFTWARE

FIELD OF THE INVENTION

The present invention relates to the field of data processing and in particular to a method and system for testing software.

BACKGROUND OF THE INVENTION

Regression testing of software is used to test changes to computer programs to make sure that older programming still works when new changes have been made. This is part of the normal program development process, required because changing or adding new code to a program can easily introduce errors into code that it is not intended to change. Regression testing comprises the development of code test scenarios and exercises to test new units of code after they have been written. Before a new version of a software product is released, the old test cases are run against the new version to make sure that all the old capabilities still work.

In the main these techniques involve manually writing tests which are run and then followed up with a manual observation of the results to detect success or failure. What is tested is dependant upon the resources available and the time within which this validation has to be performed. In manual testing one essentially has an operator manually running activities via an interface device to the system under test. This can be automated by imposing an additional system which can run a sequence of activities, and which can be a Web initiator, a Personal Computer, or any programmatic device.

In addition, the test environment will want to ensure that all operations are at least occasionally executed (to ensure full coverage). Prior art techniques, such as that disclosed in U.S. Pat. No. 6,694,509, attempt to overcome this problem, sometimes called 'missing function', where some part of the software is supposed to be tested but actually is omitted. The prior art techniques make alterations to the test suite while the system is offline or stopped. The system can then carry out further tests in a different area or manner to enforce a test structure according to the items being tested. These techniques are essentially coded versions of manual tests and do not exhibit any degree of automation apart from non-manual execution.

The present invention is based on state-based testing methods, sometimes called model-based testing, such as that described in U.S. Pat. No. 6,408,262. State-based programming is a common methodology for exploring the circumstances and testing of computer systems. In this technique, a set of states, each of which corresponds to a particular circumstance, and operations on these states, which move the system from one state to another or back to the same state, are defined. Note that what constitutes a state, or how the state of a system is determined, is an implementation-dependent variable. For example, software could announce its state; actions could be taken to ask for the current state; or actions could be taken to determine the state by reference to various externals to the chunk of software being considered.

An example of a state table is shown in Table 1:

|  | Starting state: | | | |
|---|---|---|---|---|
|  | State A | State B | State C | State D |
| Action 1 | A | D | C | B |
| Action 2 | D | D | D | A |
| Action 3 | C | B | C | D |

There are four possible states listed: A, B, C & D, each corresponding to a particular well-defined state of activity in the system under test. For the purposes of this explanation, it is irrelevant what these states actually correspond to, only that they exist and cover all the possible situations. The table also lists actions which correspond to all the possible actions that the system supports—three in this case 1, 2 & 3. Again, what these actions actually are is not relevant, but they cover all the possible actions that the system supports. In some cases, certain actions will not be valid for certain states, which means that the system would not be expected to take that action from that state.

Table 1 shows that if the software is in state A, action 1 will not actually cause a state change—the system remains in state A. However, if action 2 is executed instead of action 1, the state of the software system will move into State D. As the table shows, some states can never be entered from certain other states—for example, state C cannot be entered from state B, as none of the actions support this operation. Conversely, some actions will never cause a certain state to be entered, e.g. action 2 will never cause state C to be attained. If after executing action 2 state C is attained, an error has occurred. Similarly, if action 3 is executed while in state B and the software system ends up in state D, an error has occurred. Known techniques for processing based on state tables can easily detect failures.

A finite state diagram showing the various states and the possible transitions there-between, according to state table 1, is shown in FIG. 1A.

A state table describing a model of a system may include states such as 'stopped', from which the execution of any action should not cause a state change, as well as 'indeterminate', which indicates that an error has occurred and the state of the system cannot be ascertained.

In Table 1, there are four possible states and three possible actions. Thus, starting from a known point (say state 1) the system supports 4*3 things to be evaluated. However, one also potentially wants to start from one of the other three states as well, so there are potentially 4*4*3=48 items to test. This assumes that a single pass through the table is deterministic and always performs for the nth pass as it does on the first pass. This is, in general, an unwise assumption and so multiple passes must be executed over a long time (to test out, for example, timing or resource constraints etc.). This repetition is especially important for Regression Testing.

Some testing methods predefine one or more sequences of actions (tests) to be carried out during testing. Actions are executed in the pre-defined order, the results are examined and the process stops if something unexpected occurs. Consider the following series of discrete test runs:

A B K; A B K; A C; A B K; A D H; A B L; A C where each letter represents a different test and a semi-colon represents a re-start between runs of the testing process. Such test sequences are generated before testing begins, either randomly or on the basis of some type of failure. For example, if test K failed during the series described above, then the functionality generating test sequences (again, one fixed sequence for each run) could bias attempts to do more K function by coming up with something like:

A C; A B K; A B K; B K J; A C; B E; A B K; A B K; A B L; B K J

Analysis of the results of each of these testing sequences (occurring in separate test runs) is done to more precisely locate the bug which caused K to fail.

After each test run, the results are examined and if something has happened which is unexpected, processing stops. Some off-line analysis is done to determine the cause of the failure, and a new series of operations prepared for the next run of the testing.

Other testing methods use random selection of actions to be applied from the set of available actions with the selection of tests for a sequence of test runs being carried out before the sequence is started. In this case, each run will not cause exactly the same sequence of test operations to be executed. This is better as it is, to a limited extent, a non-repeatable sequence (over time). However, in these methods testing is still halted when an error occurs.

Note that for a predefined test run the starting state is defined. This means that operations must be carried out on the system to achieve the required starting state before testing begins.

It has been observed that software bugs tend to cluster around each other. Thus, if one bug is found there is a chance that there are others nearby which should also be detected. Prior art techniques rely on restructuring a sequence of tests offline and rely heavily on human interaction to enable investigation around a discovered bug.

The present invention aims to overcome the above problems and to improve the detection of errors.

SUMMARY OF INVENTION

A first aspect of the invention provides a method for testing a computer program on a computer system using a state table model of the computer program/system. The state table includes a plurality of possible states of the computer system and the corresponding actions which produce transitions between source and target states. A set of test programs is stored, each test program performing an action in the state table. The testing comprises selecting an action corresponding to the current state of the computer system; executing the test program which performs the selected action; determining the state of the computer system after the test program has executed; and comparing the determined state to the state indicated in the state table as the target state to the selected action on the source state. If the target and determined states are different then weightings are dynamically allocated to actions in the state table so as to bias further testing, for example, towards taking the selected action. This results in the creation of a weighted set of valid actions. Testing continues by selecting a next action corresponding to the determined state using random selection over the weighted set, and then executing the test program which performs the selected next action corresponding to the determined state. The test program which performs the selected next action is then executed.

According to a second aspect of the present invention, there is provided an apparatus for testing a computer program on a computer system. A state table model, including a plurality of possible states of the computer system and the corresponding actions which provide transitions between source and target states, and a set of test programs, each test program performing an action in the state table, are provided. The apparatus comprises a test selection component, for selecting an action corresponding to the current state of the system by random selection over a set of actions valid for the current state; an execution component for executing the test program which performs the selected action; and an analysis component. The analysis component is operable to determine the state of the computer system after a test program has executed, compare the determined state to the state indicated in the state table as the target state to the selected action on the source state; and, if the target and determined states are different, dynamically allocate weightings to actions in the state table to create a weighted set for use by the test selection component in selection of the next action.

Program execution proceeds through a series of states (via transitions). When an error is found, instead of stopping execution, the test operations to be performed are dynamically reconfigured. The test operations continue with adjusted weightings allocated to certain transitions near to the error/breakpoint location in order to focus the continued testing over time on those states and transitions near to the breakpoint. This enables a tester to discover any other bugs in the same area and also to obtain further diagnostic data on the failure.

Thus, when an erroneous state is reached, rather than stopping processing, the test is continued after an error has been found by continuing execution near to the breakpoint, for example by executing more of the actions which lead to the initial error. This continuation feature enables the detection of a cluster of software bugs.

BRIEF DESCRIPTION OF THE DRAWINGS

Preferred embodiments of the present invention will now be described by way of example only, with reference to the accompanying drawings in which.

DESCRIPTION OF PARTICULAR EMBODIMENTS

Figure 2:
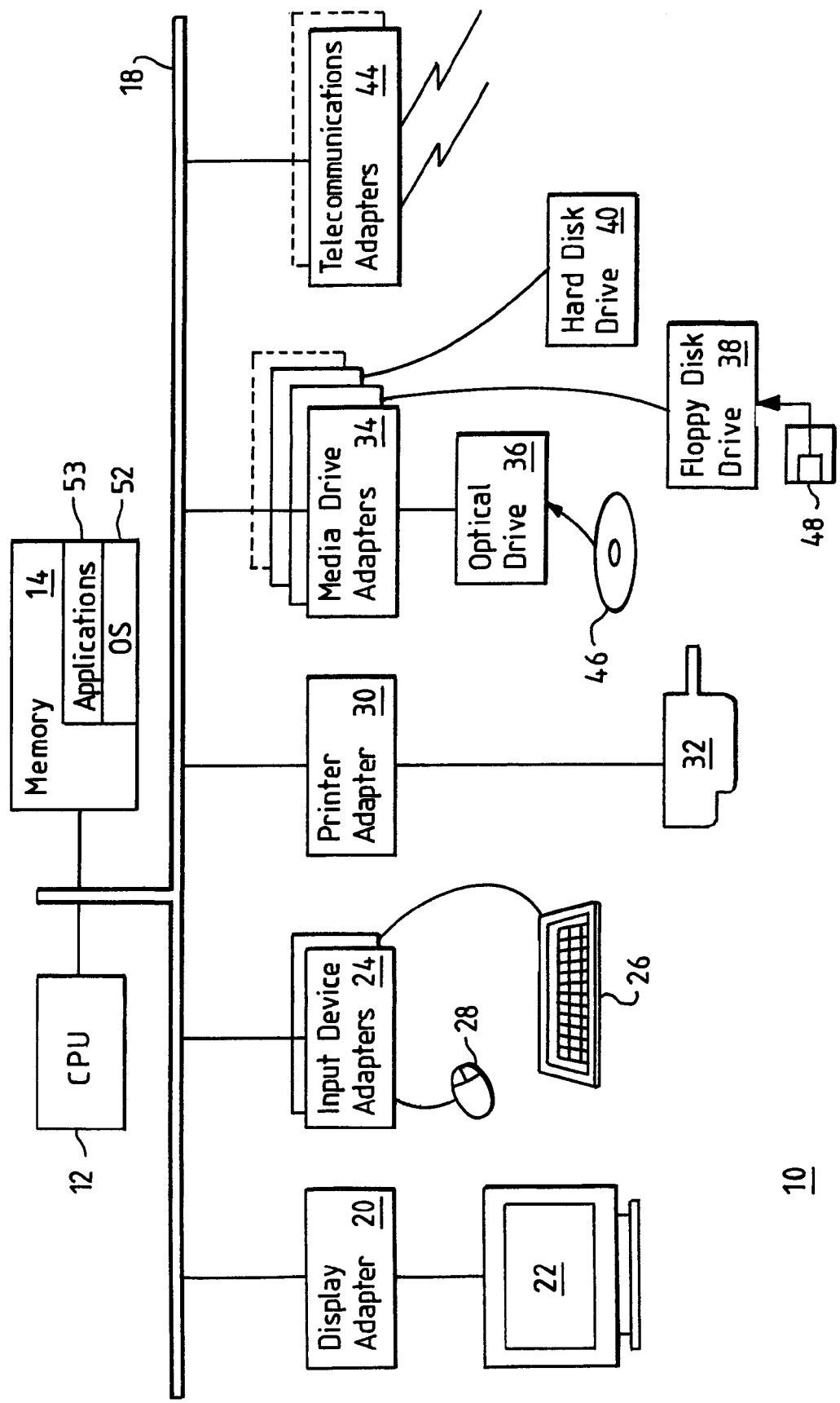
FIG. 2 shows a schematic representation of a data processing system in which the present invention may be implemented.

Referring to FIG. 2, there is shown a schematic and simplified representation of an illustrative implementation of a data processing system 10. The data processing system comprises a processor (CPU) 12, a memory 14 coupled to a bus structure 18. Memory 14 may include applications 53 and operating system (OS) 52. A display adapter 20 connects a display device 22 to the bus structure 18 and one or more user-input device adapters 24 connect the user-input devices such as the keyboard 26 and mouse 28 to the bus structure 18. An adapter 30 for the connection of a printer 32 may also be provided. One or more media drive adapters 34 are provided for connecting media drives, for example an optical disk drive 36, a floppy disk drive 38 and a hard disk drive 40, to the bus structure 18. One or more telecommunications adapters 44, such as a Local Area Network (LAN) adapter, a modem and/or ISDN terminal adapter, can be provided for connecting the data processing system to one or more networks or to other data processing systems.

It will be appreciated that FIG. 2 is a schematic representation of one possible implementation of a data processing system and that this may take many other forms. For example, data processing system 10 may be a non-PC type of computer which is Internet or network compatible, for example a web TV or set-top box for a domestic TV capable of providing access to a computer network such as the Internet. Optionally, the data processing system may be in the form of a wireless Personal Digital Assistant (PDA), or other wireless device. Data processing system 10 may comprise additional processing systems, with each processing system having additional components (or similar components with a different configuration). Moreover, the Input/Output devices shown in FIG. 2 are optional. Component parts of a data processing system may also be interconnected via methods other than a bus, such as a switch, for example. Presentation of a particular data processing system configuration is therefore not limiting on the scope of the invention.

Figure 1A:
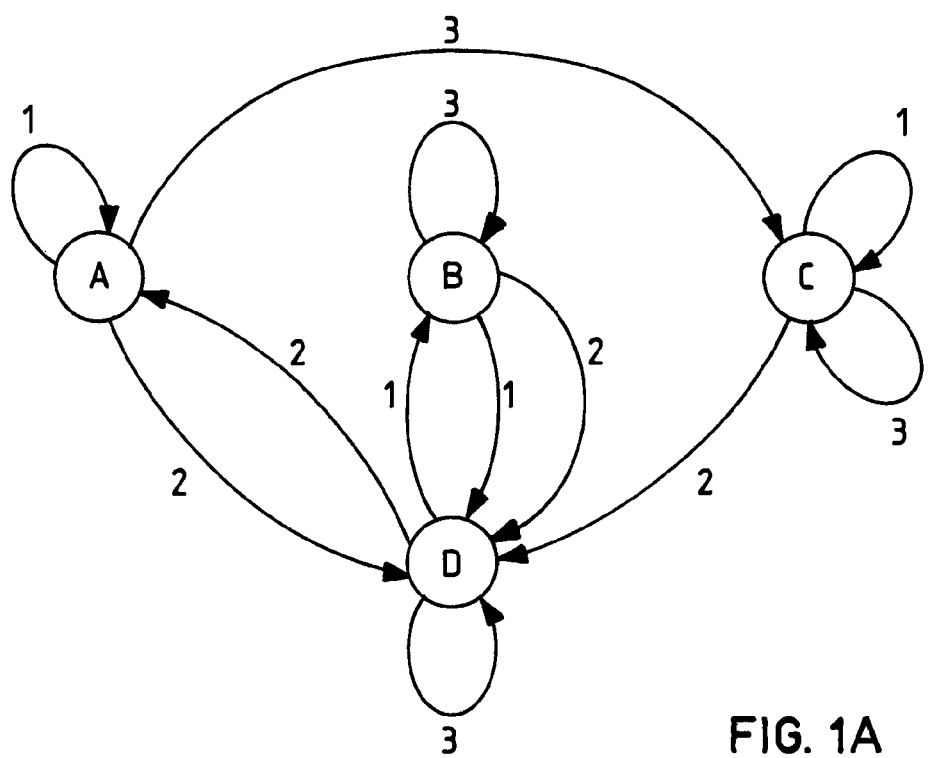
FIGS. 1A and 1B show finite state diagrams displaying the allowed transitions and states according to Tables 1 and 2 respectively.

A computer program for implementing various functions or for conveying information may be supplied on media such as one or more DVD/CD-ROMs 46 and/or floppy disks 48 and then stored on a hard disk, for example. The data processing system shown in FIG. 1 may be connected to a network such as the Internet, or a local or wide area dedicated or private network, for example.

A program implementable by a data processing system may also be supplied on a telecommunications medium, for example over a telecommunications network and/or the Internet, and embodied as an electronic signal. For a data processing system operating as a wireless terminal over a radio telephone network, the telecommunications medium may be a radio frequency carrier wave carrying suitable encoded signals representing the computer program and data. Optionally, the carrier wave may be an optical carrier wave for an optical fibre link or any other suitable carrier medium for a telecommunications system.

The first step in model-based testing is the creation of a conceptual model, which is a theoretical representation of the system's functionality defined in terms of input sequences accepted by the system, actions, conditions and output logic; or the flow of data through the applications modules or routines; and including expected inputs and outputs. This modelling process includes the creation of one or more state table(s).

Tests are then run on the system under test and actual state changes are compared with the expected state changes. According to the preferred embodiment, actions are applied to the system, and any state change is determined in order to verify whether the system under test exhibits (internal or external) behaviour/attributes in accordance with the conceptual model.

In the preferred embodiment of the present invention the test operation continues (unless the state reached is a stopped or indeterminate state) with the environment produced from the previous test, and the sequence of tests is dynamically selected rather than being pre-defined. Moreover, a weighting may be applied to certain actions to create a weighted set of actions, with selection of the next action comprising random selection over the weighted set.

In preparation for testing a computer program, a state table model 302 (see FIG. 3) of the computer program/system is generated by a state table generation component 303. The table includes a plurality of possible states of the computer system and the corresponding actions which provide transitions from source to target states. Next a set of test programs 304 is generated by a test generation component 301 and stored, each test program performing an action in the state table, and the current state of the computer system is known or determined. When ready to commence testing, an action corresponding to the current state of the computer system, that is one listed in the state table as a possible action from that current state is selected, and the test program which performs that selected action is executed. The resultant physical state of the system is determined using the test results, and compared to the target state indicated in the state table in relation to the selected action on the source state. If the target and determined states are different then an error has occurred. Instead of quitting processing, weightings are dynamically allocated to particular actions in the state table and test processing continues with the selection of the next test being determined by random selection over the weighted set.

Figure 3:
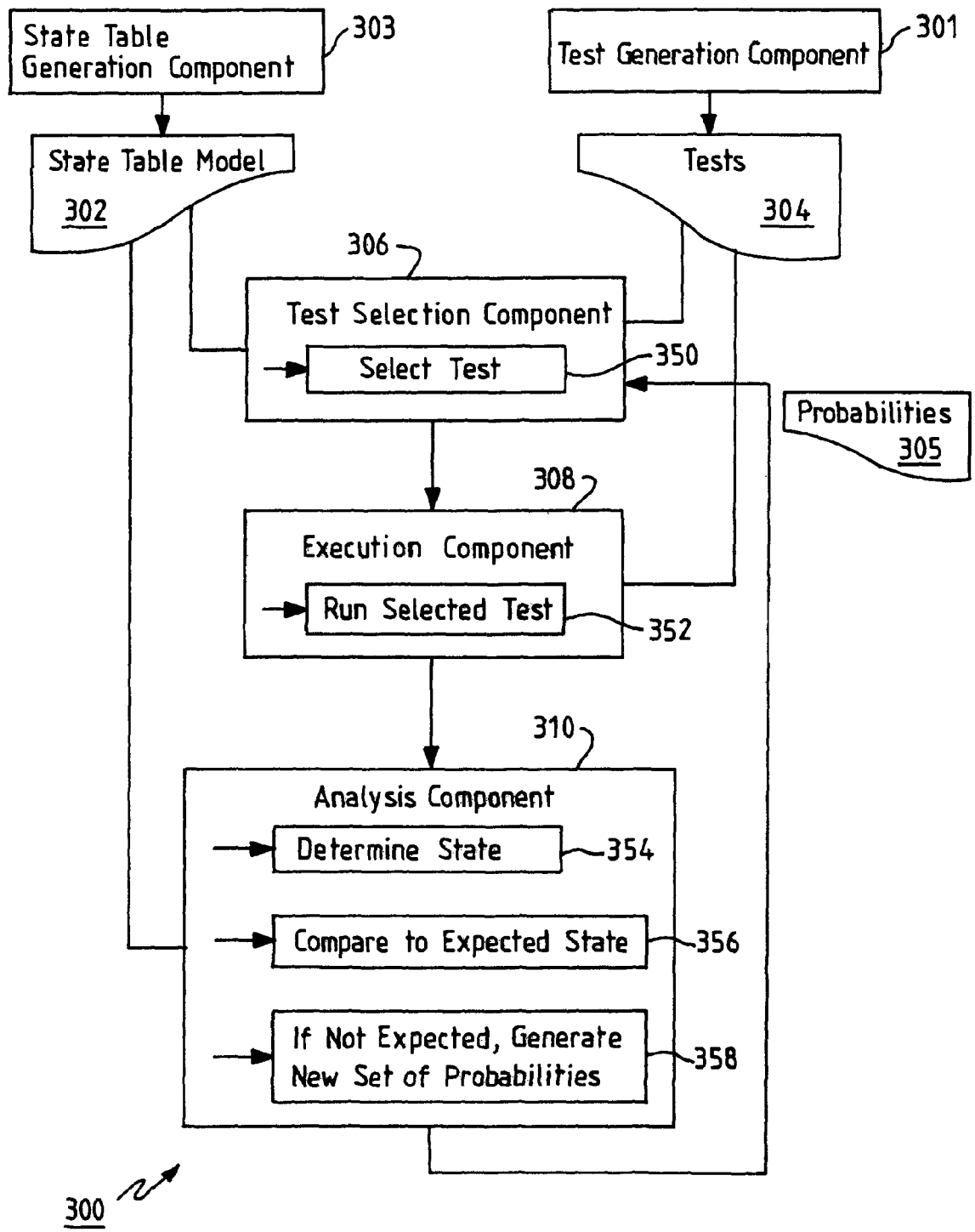
FIG. 3 shows a system and method for testing software according to an embodiment of the invention.

Referring to FIG. 3, an apparatus 300 for testing a computer program comprises a test selection component 306, an execution component 308, and an analysis component 310. The analysis component is operable to determine the state of the computer system. To carry out testing of a computer program, the test selection component 306 selects 350 a test by selecting an action corresponding to the current state of the computer system. The execution component 308 then executes the selected test program 352 which performs the selected action. The analysis component 310 then determines 354 the state of the computer system after the test program has executed; compares 356 the determined state to the state indicated in the state table as the target state to the selected action on the source state; and if the target and determined states are different, dynamically generates and allocates weightings 358 (in the form of probabilities 305, for example) to actions in the state table to bias further testing towards taking a certain action or to achieve a certain state. If the target and determined states correspond correctly then the analysis component does not need to generate a new weighted set. Testing continues with the repetition of steps 350 to 358, with the next test being chosen through selection of an action corresponding to the determined state through random selection over the (new or previous) weighted set. Success of a test leads to the selection of the next test using the previously allocated weightings, if any. Failure of a test leads to generation of different test sequences enabling a focus, over time, on the failing area.

The initial selection of an action on start of the test run may be taken at random from all the available actions corresponding to the current state of the system, or selected according to other criteria. Alternatively, initial weightings may be allocated to certain actions in the state table to make a weighted set, with selection of the first action being made through random selection over the weighted set. The step of dynamically allocating weightings to actions in the state table when an error is discovered may comprise modifying one or more previously allocated weightings.

Using Table 1 as an example, an embodiment of the invention considers the fact that a system in state B ended up in state C after action 3 was executed, there is something wrong with action 3, and then decides to do action 3 and/or to transition from state B to C several times over to investigate the problem further. This is achieved by allocating different weightings (priorities) to each state or action, which are then taken into account in the selection of the next test action. The allocation of weightings may be achieved by allocating probabilities to actions or states in the state table and selecting a state and/or action for inclusion in a test run depending upon the probabilities applied.

For example, if an error is found in relation to action 3, the probabilities of action 3 occurrences may be amended to those shown in Table 2:

|  | Starting State: | | | |
| --- | --- | --- | --- | --- |
|  | State A | State B | State C | State D |
| Action 1 | A (0.25) | D (0.30) | C (0.33) | B (0.01) |
| Action 2 | D (0.25) | D (0.30) | D (0.22) | A (0.39) |
| Action 3 | C (0.50) | B (0.40) | C (0.45) | D (0.60) |

Figure 1B:
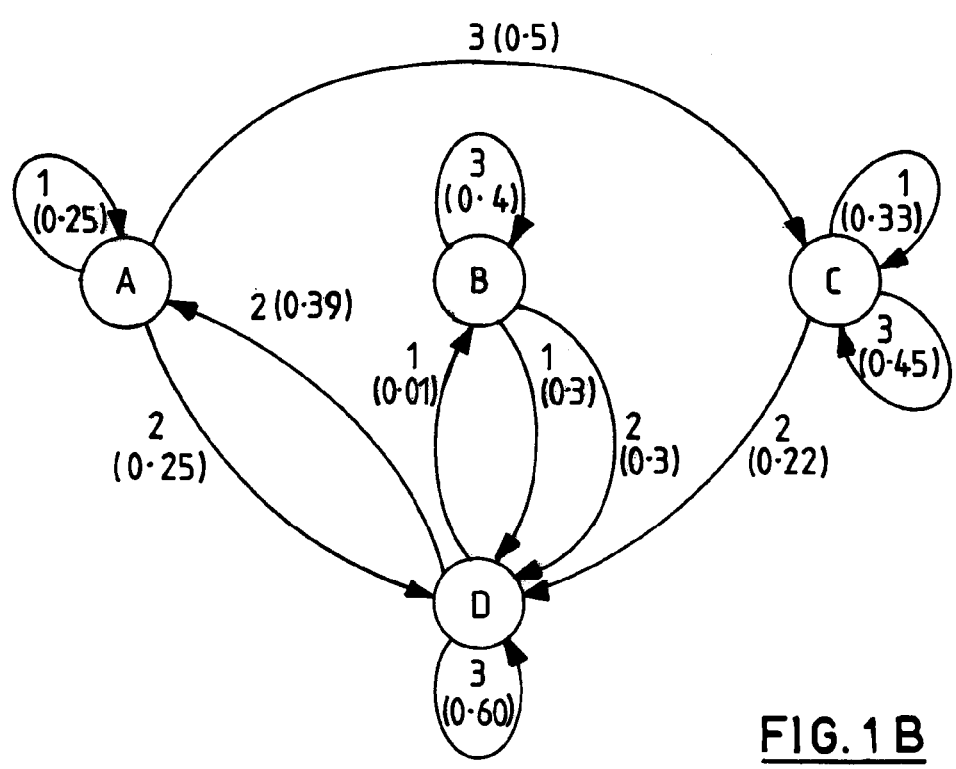

The only constraint on the probabilities is that for each state the probabilities summed over the actions equals 1. In the case shown above, a strong bias to do action 3 in state D is selected but only a slightly increased emphasis while in state B is selected. As the table shows, there is a lack of interest in doing action 1 in state D, though a non-zero probability is used to ensure that this path may still be executed as part of the testing operation. FIG. 1B shows the probabilities applied to each transition.

Using the weightings shown in Table 2, selection of a next action when the system is determined to be in state A would comprise random selection over the set of actions: {1,2,3,3}. From state B, the weighted set would be: {1,1,1,2,2,2,3,3,3, 3}; and so on.

In addition to altering the probabilities when an error is found, these can also be used to bias away from successful states or transitions by altering the probabilities for these paths to lower (but still non-zero) values.

For example, to test going into a particular state more frequently, the probabilities of those cells which cause a transition to this state can be increased. If it is detected that a given state does not occur frequently, the actions that lead to this state can be increased in probability so that due emphasis is given to that state. If it is detected that a given action does not occur with a desired frequency, the probabilities of running such action are increased to ensure that sufficient coverage of this function is provided.

If an error is found in relation to a particular action, the relative probabilities of reaching that action from all of the states can be increased (with the probabilities of the other actions being correspondingly reduced) to ensure that increased emphasis is given to the operation/action in relation to which the initial error was found.

The precise way in which bias towards a given action is achieved in a particular test is dependent on the test environment and implementation. One possibility would be for the software that takes diagnostics for a failure to implement this logic; another would be for logic that detects a state change, or processes the state table, to implement this function.

Software testing can proceed in a self-configuring fashion so that when an unexpected condition arises, subsequent tests are biased towards the problem area. This enables additional problem conditions to be automatically detected and generated as a result of an earlier failure. As software failures tend to occur in groups, the detection of one failure leads to detection of the cluster of failures in the software.

This dynamic selection mechanism does away with the batch post-analysis processing. Weightings are manipulated directly during the test run which does not stop processing when a failure occurs. This enables the test run to adjust itself automatically to find more problems by hitting a problem area more thoroughly during the test run. Diagnostics may be run continually during a test run or may be initiated once an error has occurred.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disc or tape, optically or magneto-optically readable memory such as compact disk (CD) or Digital Versatile Disk (DVD) etc, and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

The scope of the present disclosure includes any novel feature or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method for testing a computer program on a computer system modeled according to a state table, the state table comprising a plurality of distinct actions and each of the actions corresponds to a test program for performing the action, the method comprising:

selecting an action from a set of valid actions capable of being performed in a current state of the computer system;

executing a test program that corresponds to the selected action;

determining a state of the computer system after the test program that corresponds to the selected action has executed;

comparing the determined state to a target state indicated in the state table as resulting from the selected action being performed on the previous current state; and upon determining that the target state and the determined state are different, dynamically allocating weightings to the actions in the state table to create a weighted set, the weightings to the actions in the state table being allocated to increase a relative probability of a subsequent test selecting the selected action; and continuing testing by selecting a next action, by random selection using the weighted set, corresponding to the determined state of the system and executing a test program that corresponds to the selected next action.

2. A method according to claim 1, further comprising creating the state table, the state table including a plurality of possible source states of the computer system and corresponding actions that transition the source states, respectively, to target states.

3. A method according to claim 1, wherein
the action is randomly selected using a weighted set of the valid actions capable of being performed in the current state.

4. An apparatus for testing a computer program on a computer system, the apparatus comprising:
at least one computing device having a processor and a memory, including:
a state table model of a computer program, the state table including
a plurality of possible source states of the computer system,
corresponding distinct actions that transition the current states, respectively, to target states, each of the actions corresponds to a test program for performing the action;
a test selection component for selecting an action from a set of valid actions capable of being performed in a current state of the computer system;
an execution component for executing a test program that corresponds to the selected action; and
an analysis component for
determining a state of the computer system after the test program that corresponds to the selected action has executed, and
comparing the determined state to a target state indicated in the state table as resulting from the selected action being performed on the previous current state, and
dynamically allocating weightings to the actions in the state table to create a weighted set for use by the test selection component in selecting a next action, the weightings to the actions in the state table being allocated to increase a relative probability of subsequent test selecting the selected action.

5. An apparatus according to claim 4, further comprising a state table generation component for generating the state table model.

6. An apparatus according to claim 4, further comprising a test generation component for generating the set of test programs.

7. An apparatus according to any of claim 6, wherein
the action is randomly selected using a weighted set of the valid actions capable of being performed in the current state.

8. An apparatus according to claim 4, further comprising a diagnostics component for storing diagnostic data about the system under test.

9. A computer readable medium having a computer program product stored therein for testing a computer program on a computer system modeled according to a state table, the state table comprising a plurality of distinct actions and each of the actions corresponds to a test program for performing the action, the computer program when executed by a computer device causes the computer device to perform the actions of:
selecting an action from a set of valid actions capable of being performed in a current state of the computer system;
executing a test program that corresponds to the selected action;
determining a state of the computer system after the test program that corresponds to the selected action has executed;
comparing the determined state to a target state indicated in the state table as resulting from the selected action being performed on the previous current state; and
upon determining that the target state and the determined state are different, dynamically allocating weightings to the actions in the state table to create a weighted set, the weightings to the actions in the state table being allocated to increase a relative probability of a subsequent test selecting the selected action; and
continuing testing by selecting a next action, by random selection using the weighted set, corresponding to the determined state of the system and executing a test program that corresponds to the selected next action.

10. A computer readable medium according to claim 9, further comprising
creating the state table, the state table including
a plurality of possible source states of the computer system and
corresponding actions that transition the source states, respectively, to target states.

11. A computer readable medium according to claim 9, wherein
the action is randomly selected using a weighted set of the valid actions capable of being performed in the current state.

* * * * *